United States Patent [19]
Kaneko et al.

[11] Patent Number: 5,615,049
[45] Date of Patent: Mar. 25, 1997

[54] INTERNAL FOCUS OBJECTIVE LENS

[75] Inventors: Masanobu Kaneko; Masaaki Yanagisawa, both of Kanagawa-ken, Japan

[73] Assignee: Nikon Corporation, Tokyo, Japan

[21] Appl. No.: 403,436

[22] Filed: Mar. 14, 1995

[30] Foreign Application Priority Data

Mar. 15, 1994 [JP] Japan .................................. 6-070036

[51] Int. Cl.$^6$ ................. G02B 9/62; G02B 9/60
[52] U.S. Cl. .................... 359/684; 309/761; 309/763; 309/770
[58] Field of Search .................................. 359/684, 770, 359/761, 763

[56] References Cited

U.S. PATENT DOCUMENTS

| | | |
|---|---|---|
| 2,660,093 | 11/1953 | Bertele . |
| 4,037,935 | 7/1977 | Momiyama . |
| 4,206,971 | 6/1980 | Hamanishi et al. . |
| 4,359,272 | 11/1982 | Kreitzer . |
| 4,457,595 | 7/1984 | Mihara . |
| 5,309,284 | 5/1994 | Nakatsuji . |
| 5,402,268 | 3/1995 | Tatsuno . |

FOREIGN PATENT DOCUMENTS

| | | |
|---|---|---|
| 62-14613 | 1/1987 | Japan . |
| 63-27686 | 6/1988 | Japan . |
| 63-55045 | 11/1988 | Japan . |
| 0063614 | 3/1991 | Japan . |
| 0466477 | 4/1975 | U.S.S.R. . |

Primary Examiner—Georgia Y. Epps
Assistant Examiner—Jacqueline M. Steady
Attorney, Agent, or Firm—Oliff & Berridge

[57] ABSTRACT

A compact internal focus objective lens system utilized in an astronomical telescope, tenestrical telescope, photo lens or the like has a superior ability to compose images when focusing on close or near objects. The lens system includes, in order from the object side, a first lens group G1 with a positive refractory power and a second lens group G2 with a negative refractory power. The first lens group G1 includes a composite lens L1 with a negative lens L11 and a positive lens L12 and a single lens L2 with a positive refractory power. The second lens group G2 has a composite lens L3 that has an overall negative refractory power. The second lens group G2 is moved along the optical axis for focusing. The objective lens satisfies the following conditions, thus permitting the compact internal focus objective lens system to clearly compose images, when focusing on close or near objects:

$0.3 < f1/F < 0.6$
$-0.5 < f2/F < -0.2$
$0.15 < r4/F < 0.35$
$-1.5 < (r6+r8)/(r6-r8) < 1.5$
$0.15 < r2/F < 0.4$
$40 < \nu 1 < 55$
$80 < \nu 2$.

24 Claims, 8 Drawing Sheets

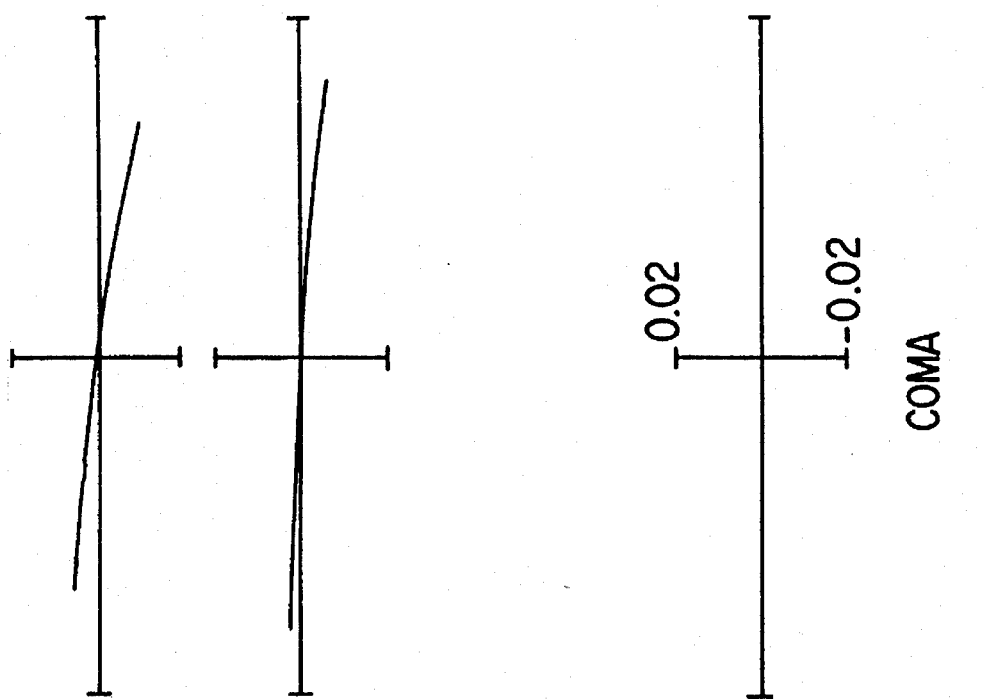
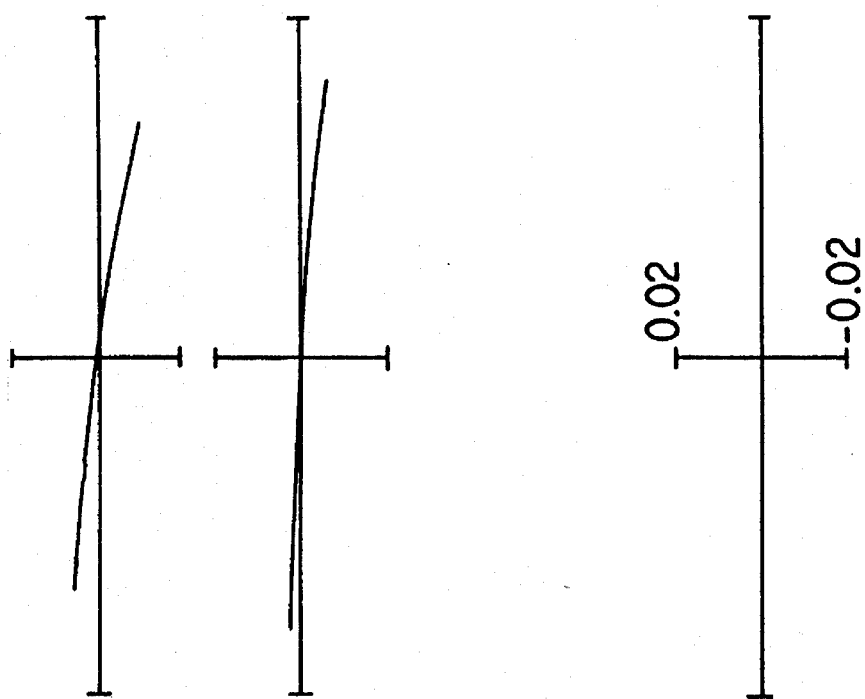
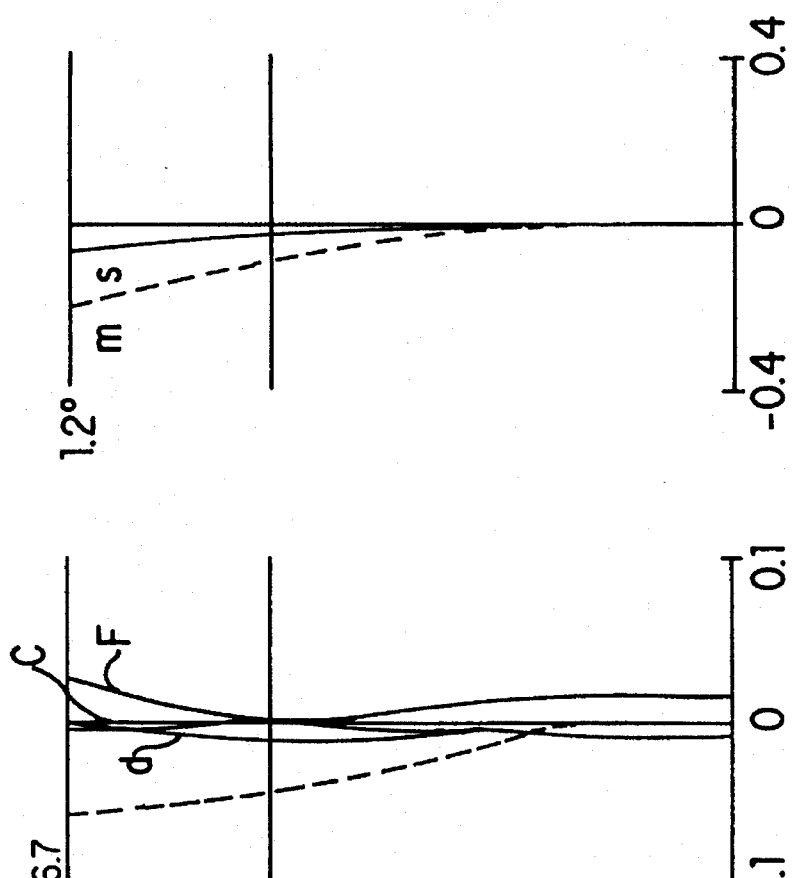
FIG. 2a SPHERICAL ABERRATIONS
FIG. 2b ASTIGMATIC ABERRATIONS
FIG. 2c COMA

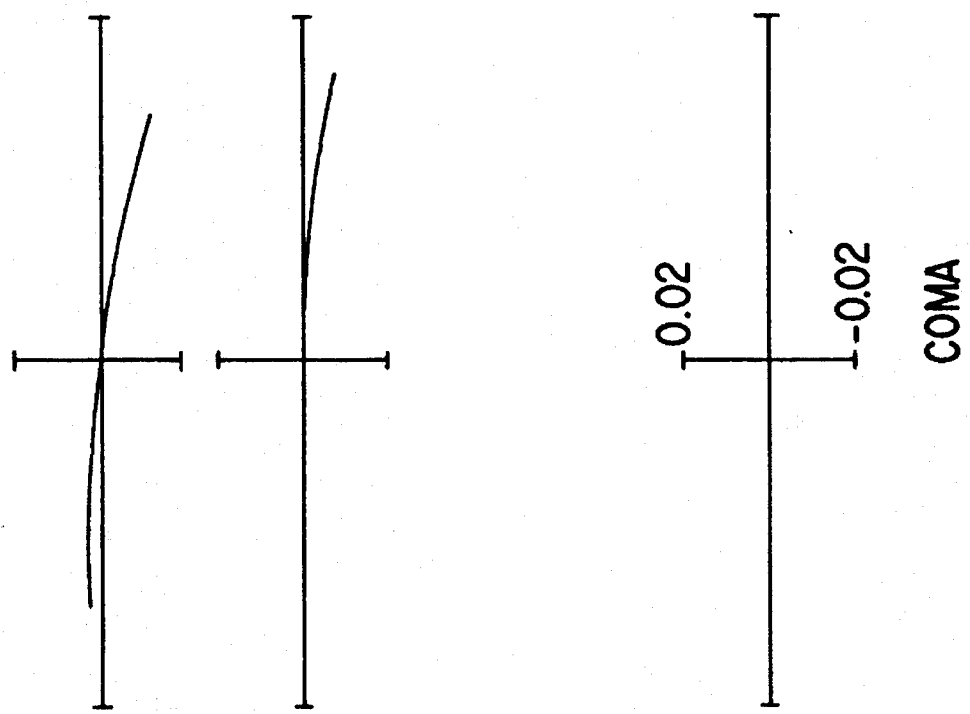
FIG.3c COMA
FIG.3b ASTIGMATISM ABERRATIONS
FIG.3a SPHERICAL ABERRATIONS

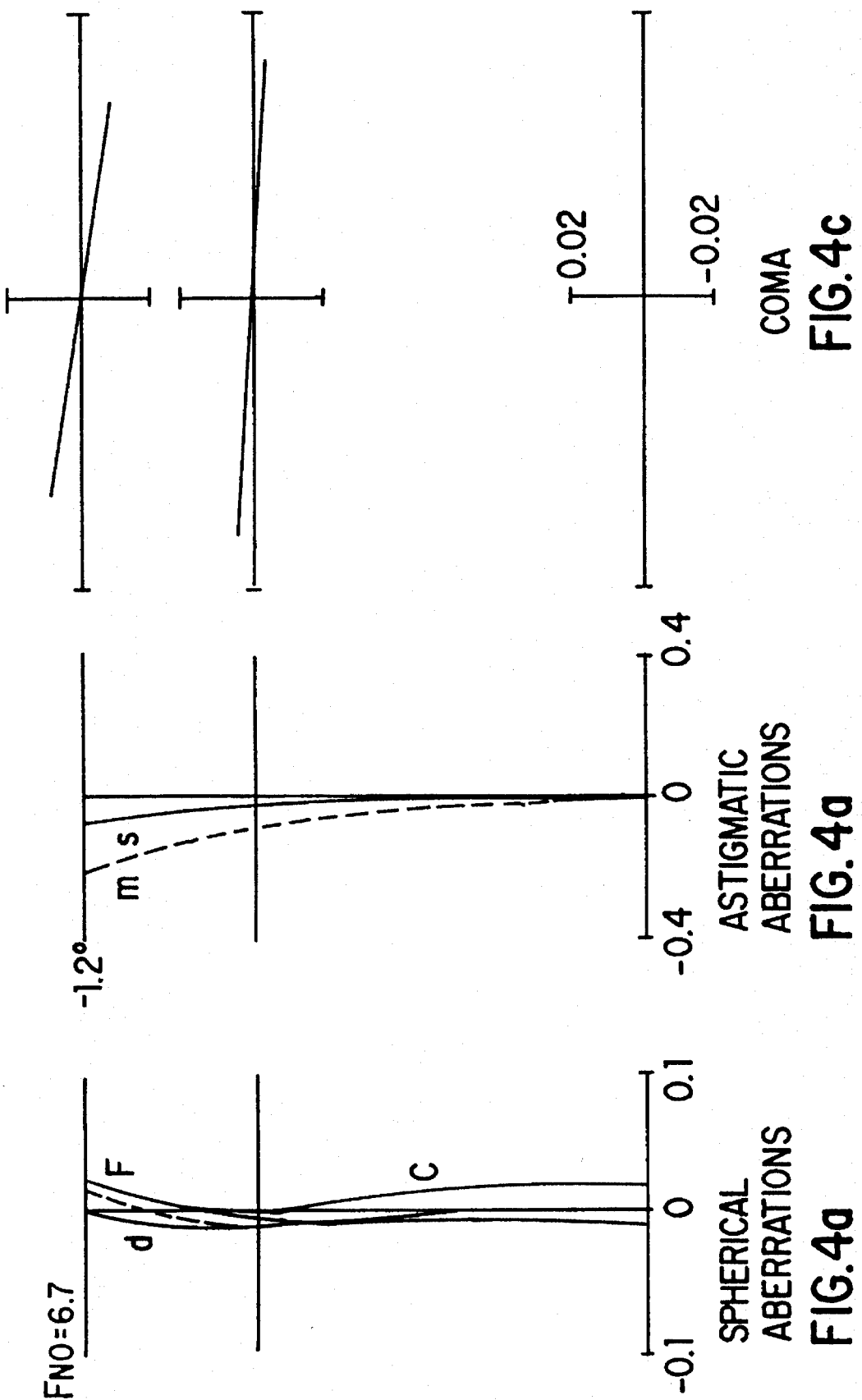

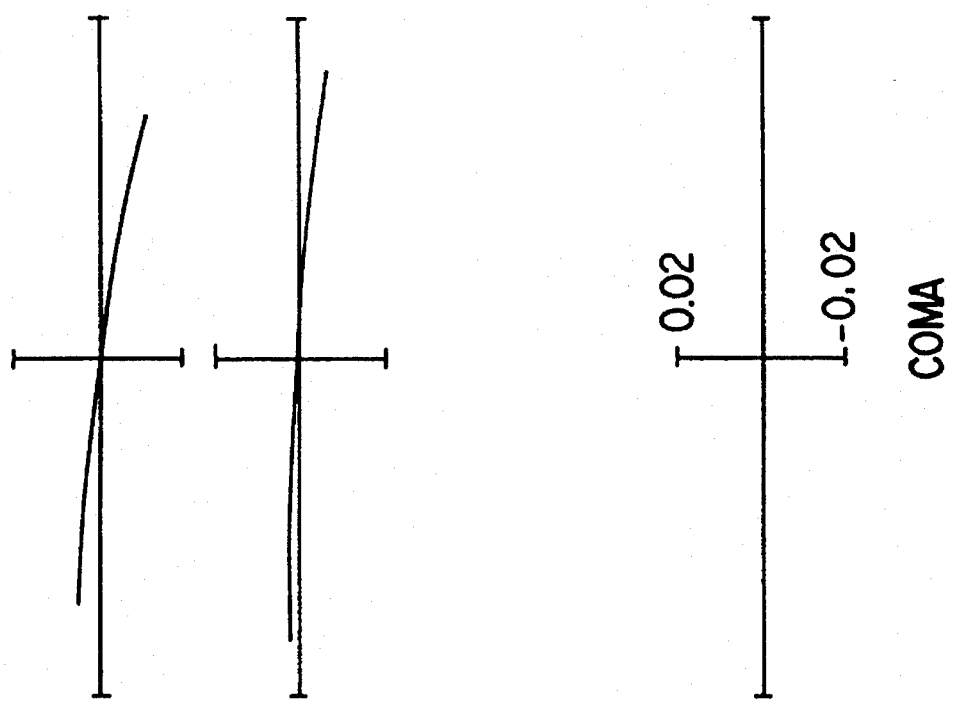
FIG.5a SPHERICAL ABERRATIONS
FIG.5b ASTIGMATIC ABERRATIONS
FIG.5c COMA

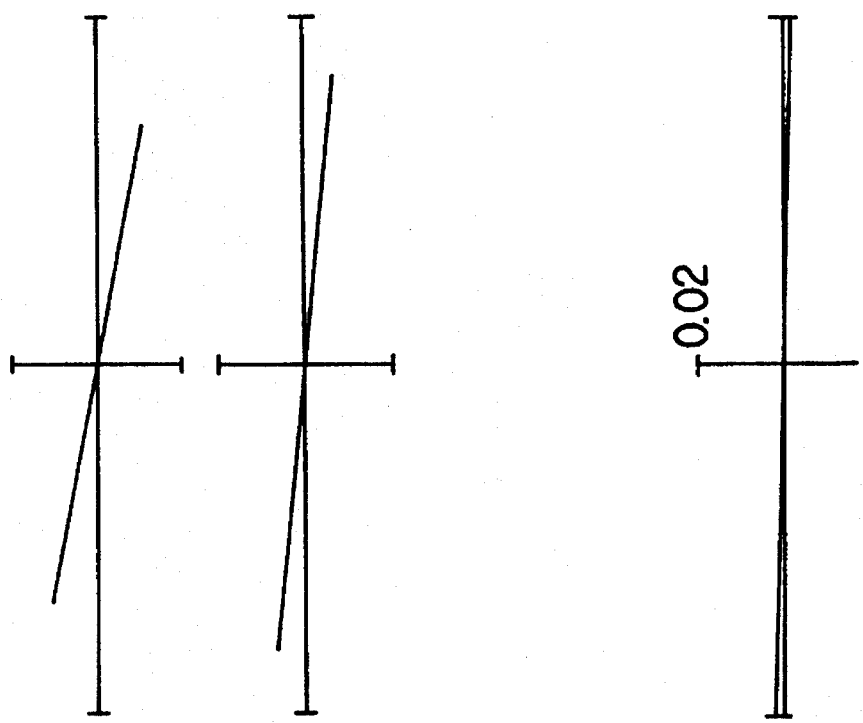
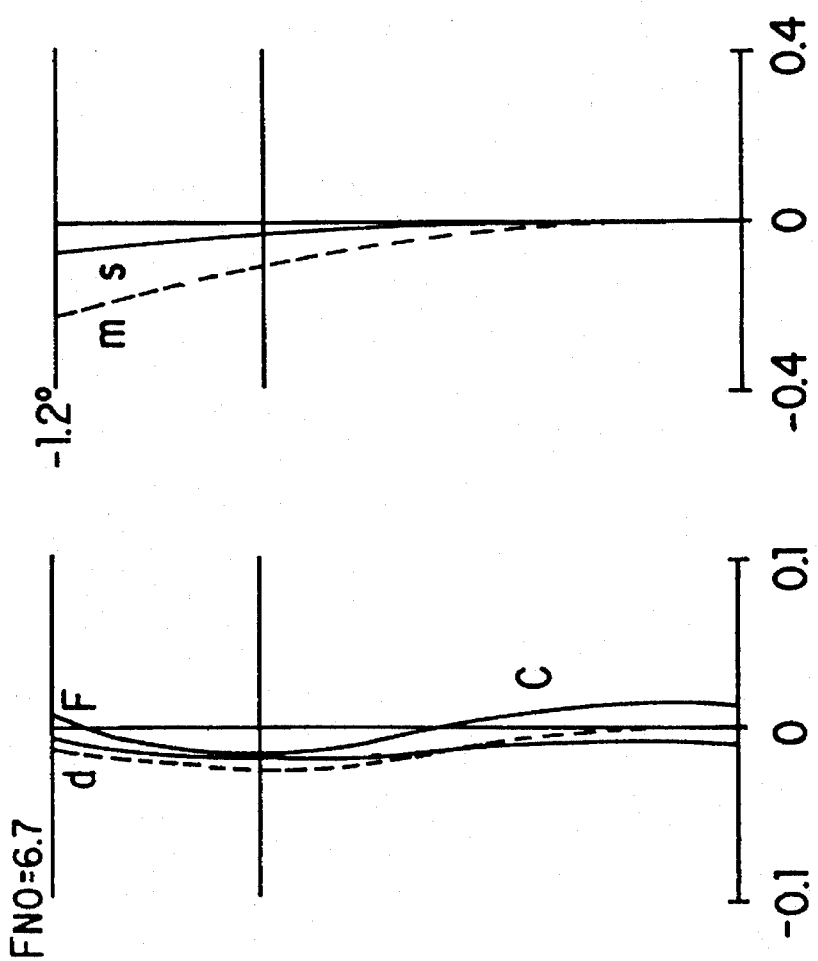
FIG. 6a SPHERICAL ABERRATIONS
FIG. 6b ASTIGMATIC ABERRATIONS
FIG. 6c COMA

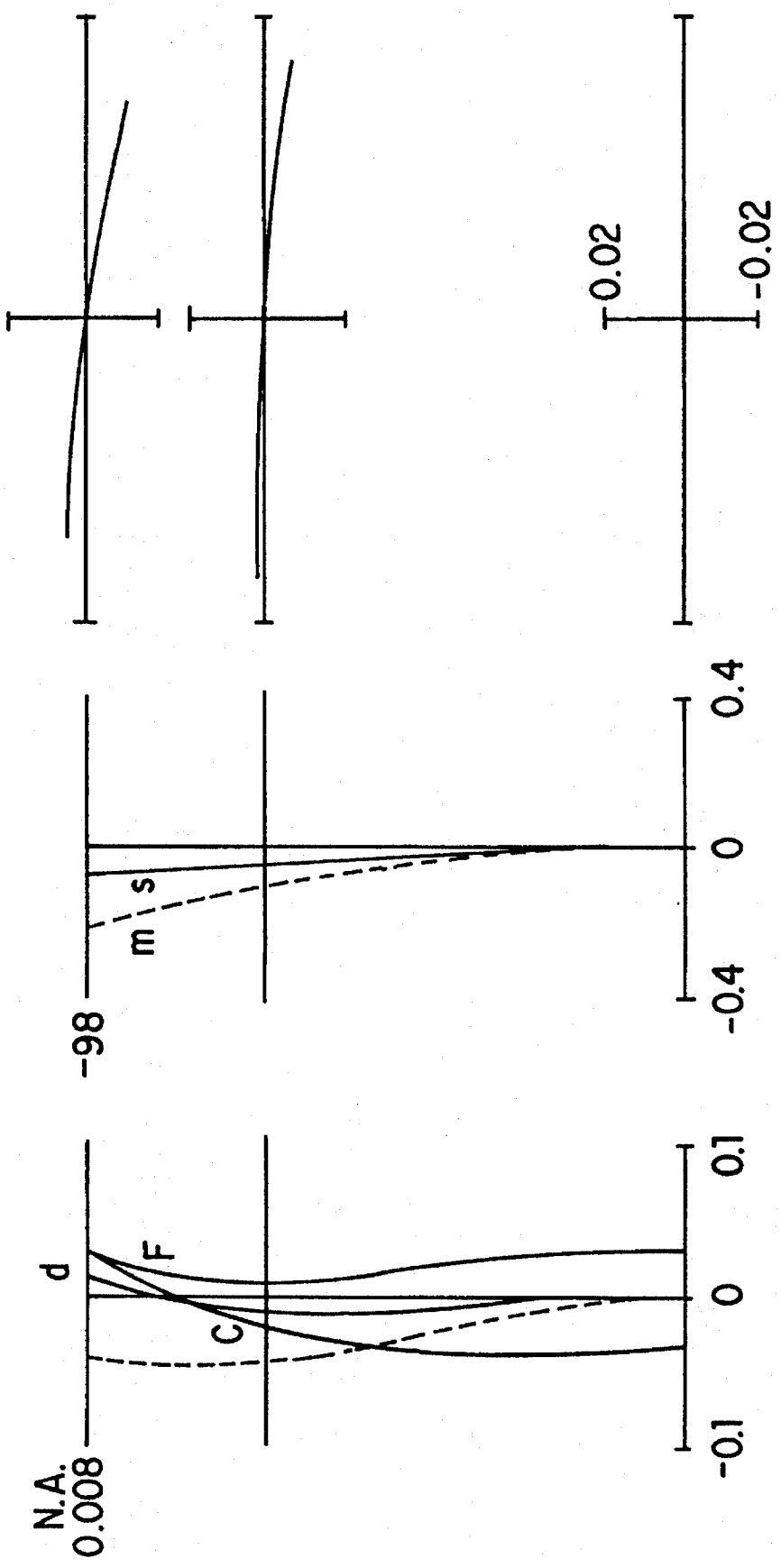

INTERNAL FOCUS OBJECTIVE LENS

BACKGROUND OF THE INVENTION

1. Field of the Invention

The present invention relates to an internal focus objective lens. Specifically, the present invention relates to an objective lens that is used with an astronomical telescope, terrestrial telescope, photo lens, and the like. The focusing on near objects is accomplished by moving a lens group that forms part of the objective lens.

2. Description of Related Art

Internal focus objective lenses are known as disclosed by Japanese Laid-Open Patent Application No. 51-32327. U.S. Pat. No. 4,027,935 to Momiyama is a U.S. equivalent of the Japanese application. The objective lens of the Japanese application is a telephoto-type objective lens. It includes, in order from the object side, a first lens group with a positive refractory power and a second lens group with a negative refractory power. Generally, a telephoto-type objective lens has the ability to have a lens length, defined as the distance from the optical system surface closest to the object to the image surface, shorter than focal distance of the lens system. In addition, the objective lens is an internal focus-type lens. Internal focus objective lenses carry out focusing on close objects by moving a second lens system along the optical axis toward the image side. Further, the optical system can be made waterproof by the above arrangement where only the second lens system moves in the lens system's housing.

However, with the conventional internal focus objective lens described above, the overall length of the objective lens is long. This arrangement does not permit the optical system to be compact. In addition, since the distance that the second or focus lens group moves is long to focus on close objects, it is difficult to properly correct the various aberrations.

SUMMARY OF THE INVENTION

It is an object of the present invention to overcome these problems by providing an internal objective lens that is compact. It is a further object of the present invention to provide a lens arrangement having superior ability to focus and compose images without aberrations, especially when focusing on close objects.

In order to resolve the problems described above, the present invention comprises an internal focus objective lens. The lens includes from the object side of the lens, a first lens group with a positive refractory power and a second lens group with a negative refractory power. The first lens group comprises a composite lens having a negative lens and a positive lens and single lens with a positive refractory power. The second lens group has a composite lens that has an overall negative refractory power. The second lens group is movable along an optical axis. Thus, proper focusing on close objects can be readily accomplished.

Taking the focal length of the entire lens system as F, the focal length of the first lens group G1 as f1, the focal length of the second lens group G2 as f2, the radius of curvature of the joining surface in the composite lens L1 within the first lens group G1 as r2, the radius of curvature of the object side of the single lens L2 of the first lens group G1 as r4, the radius of curvature of the object side of the composite lens L3 of the second lens group G2 as r6, the radius of curvature of the image side of the composite lens L3 of the second lens group G2 as r8, the Abbe constant of the negative lens L11 that forms the composite lens L1 within the first lens group G1 as ν1, and the Abbe constant of the positive lens L12 that forms the composite lens L1 of the first lens group G1 as ν2, the lens system of the present invention satisfies following conditions:

$0.3 < (f1/F) < 0.6$ $-0.5 < (f2/F) < -0.2$ $0.15 < (r4/F) < 0.35$ $-1.5 < (r6+r8)/(r6-r8) < 1.5$ $0.15 < (r2/F) < 0.4$ $40 < \nu 1 < 55$ $80 < \nu 2$.

BRIEF DESCRIPTION OF THE DRAWINGS

Preferred embodiments are described with reference to the drawings, in which like reference characters denote like elements throughout the figures, and in which:

FIGS. 2a, 2b and 2c are representative of the spherical aberrations, astigmatic aberrations and coma, respectively in the infinite focus condition according to a first embodiment of the invention;

FIGS. 3a, 3b and 3c are representations of the spherical aberrations, astigmatic aberrations and coma, respectively in the close focus condition according to a first embodiment of the invention;

FIGS. 4a, 4b and 4c are representations of the spherical aberrations, astigmatic aberrations and coma, respectively in the infinite focus condition according to a second embodiment of the invention;

FIGS. 5a, 5b and 5c are representations of the spherical aberrations, astigmatic aberrations and coma, respectively in the close focus condition according to a second embodiment of the invention;

FIGS. 6a, 6b and 6c are representations of the spherical aberrations, astigmatic aberrations and coma, respectively in the infinite focus condition according to a third embodiment of the invention;

FIGS. 7a, 7b and 7c are representations of the spherical aberrations, astigmatic aberrations and coma, respectively in the close focus condition according to a third embodiment of the invention.

DETAILED DESCRIPTION OF THE PREFERRED EMBODIMENTS

Figure 1:
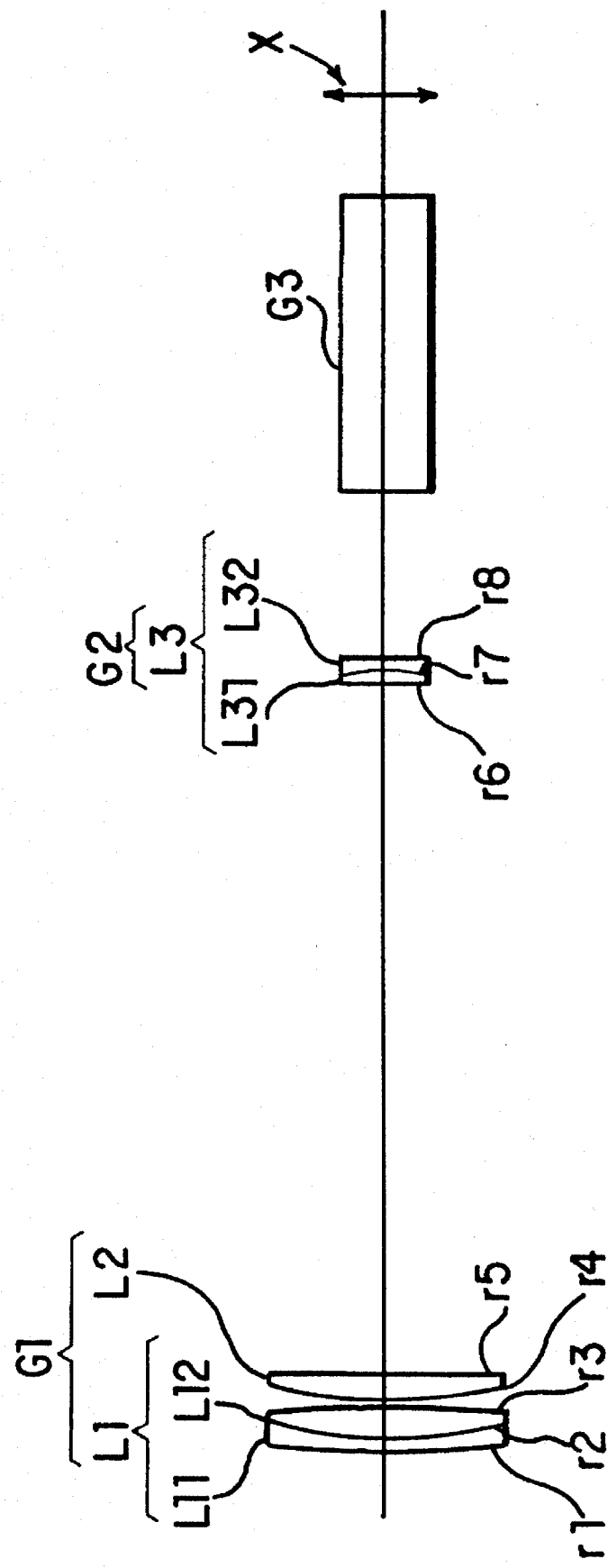
FIG. 1 is a schematic drawing illustrating the structure of an internal focus-type objective lens that relates to a first preferred embodiment of the present invention.
Figure 8:
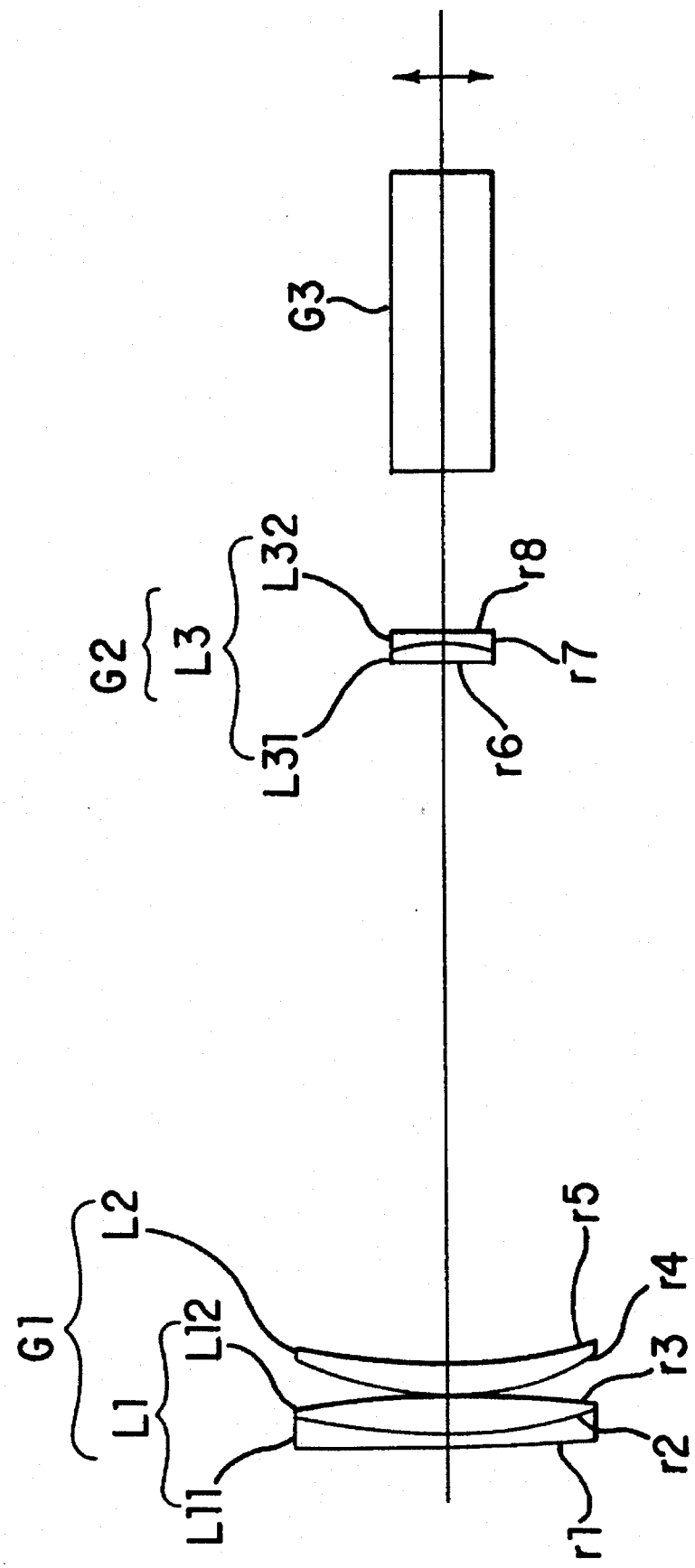
FIG. 8 is a schematic drawing illustrating the structure of an internal focus-type objective lens according to a second preferred embodiment of the invention.

FIG. 1 is a schematic drawing that shows the structure of an internal focus objective lens system of the present invention. The internal focus objective lens comprises, in order from the object side of the lens, a first lens group G1 with a positive refractory power and a second lens group G2 with a negative refractory power. The first lens group G1 comprises a composite lens L1 with a negative lens L11 and a positive lens L12 and a single lens L2 with a positive refractory power. The second lens group G2 has a composite lens L3 that has overall negative refractory power. The second lens group G2 is movable along the optical axis for focusing on close objects.

With the present invention, the focal length f2 of second lens group G2 is given a negative value in order to shorten the overall length of the lens. The second lens group G2 is configured so that the absolute value |f2| of the focal length f2 is smaller than the focal length F of the lens system as a whole, within a fixed range.

Furthermore, the first lens group G1 is configured so that the focal length f1 is smaller than the focal length F of the lens system as a whole, within a fixed range. This decreases the amount of movement required for the second lens group G2 during focusing. When the distance that the second lens group G2 moves is decreased, a rapid focusing becomes possible. In addition, since the amount of movement of the second lens group is small, problems such as eccentricity or the like hardly ever occur. Also, it becomes possible to focus on the object much closer (very close objects), if the amount of the movement of the second lens group was the same as the ordinary lens system, by shortening the movement required to focus on an object at a given distance.

In addition to the various conditions described above, not only must various aberrations in the infinite focus condition be properly corrected, it is also necessary to properly correct various aberrations in the close focus condition.

Accordingly, the following conditions (1) through (7) must be met in order for the objective lens of the present invention to achieve proper image composition, even for close focus conditions, (1) $0.3 < (f1/F) < 0.6$ (2) $-0.5 < (f2/F) < -0.2$ (3) $0.15 < (r4/F) < 0.35$ (4) $-1.5 < (r6+r8)/(r6-r8) < 1.5$ (5) $0.15 < (r2/F) < 0.4$ (6) $40 < v1 < 55$ (7) $80 < v2$ In the above expressions,
F=focal length of lens system as a whole;
f1=focal length of the first lens group G1;
f2=focal length of the second lens group G2;
r2=radius of curvature of the joining surface of the composite lens L1 within the first lens group G1;
r4=radius of curvature of the object side surface of the single lens L2 within the first lens group G1;
r6=radius of curvature of the object side surface of the composite lens L3 of the second lens group G2;
r8=radius of curvature of the image side surface of the composite lens L3 of the second lens group G2;
v1=Abbe constant of the negative lens L11 that forms the composite lens L1 within the first lens group G1; and
v2=Abbe constant of the positive lens L12 that forms the composite lens L1 within the first lens group G1.

Condition (1) is a condition that limits the amount of movement for focusing with the second lens group G2. If the upper limit of condition (1) is exceeded, the focal length of the first lens group G1 increases. As a result, the amount of movement to focus the second lens group G2 becomes too large. Thus, a rapid focusing action becomes impossible and this condition is undesirable.

Conversely, if the focus movement amount is less than the lower limit of condition (1), the focus movement of the second lens group G2 is decreased, however, the F number of the first lens group G1 becomes too small to be practical. As a result, spherical aberrations and chromatic aberrations become excessive. The chromatic aberrations in the infinite focus condition and in close focus condition can no longer be balanced. This condition is also undesirable.

Condition (2) is a condition that limits the length of the lens as a whole. If the upper limit of condition (2) is exceeded, the length of the whole lens system becomes large. A compact optical system is no longer possible.

Conversely, if the length of the lens is shorter than the lower limit of condition (2), the length of the lens as a whole is decreased. However, comatic aberrations or comas in the infinite focus condition and comatic aberrations in the close focus condition cannot be balanced. Thus, if the length of the lens is shorter than the lower limit of condition (2), it becomes very difficult to properly correct focal lengths. A further problem arises in a terrestrial telescope. In a lens system for a terrestrial telescope where the lens length is shorter than the lower limit of condition (2), the lens system requires reversion components, such as an erecting prism or the like. It is difficult to provide a space for positioning the reversion component since the distance between the second lens group G2 and the image surface is decreased.

Condition (3) establishes a proper range for the radius of curvature r4 of the single lens L2 on the object side. If the range of condition (3) is deviated from, comatic aberrations in the infinite focus condition and the close focus condition cannot be balanced. In addition, astigmatisms worsen in both the infinite and close focus conditions, if the range of condition (3) is not met.

Condition (4) is a condition that establishes the proper range for the form of composite lens L3 in the focus lens group or second lens group G2. If condition (4) is deviated from and the range of condition (4) is not met, it becomes difficult to properly correct and balance the comatic aberrations in the infinite and close focus conditions.

Condition (5), along with conditions (6) and (7), set forth conditions relating to chromatic aberrations. Conditions (5) and (6) keep the system's secondary spectrum small. Conditions (6) and (7) provide for the proper correction of chromatic aberrations. In conditions (6) and (7), a proper chromatic aberration correction can be accomplished by keeping the Abbe constant of the composite lens L1 within a fixed range.

Condition (5) is a condition that establishes the proper range for the radius of curvature r2 of the joining surface in the composite lens L1. If the upper limit of condition (5) is exceeded, the chromatic aberrations are not sufficiently corrected. Conversely, if the radius r2 is shorter than the lower limit of condition (5), the chromatic aberrations are over-corrected, and the spherical aberrations worsen.

If the Abbe constant v1 of the negative lens L11 of the composite lens L1 is lower than the lower limit of condition (6), the secondary spectrum worsens, and a proper chromatic aberration correction cannot be obtained. If the constant v1 is lower than the lower limit of condition (6), the secondary spectrum worsens. A proper chromatic aberration correction is not achievable, even if the Abbe constant v2 of the positive lens L12 is kept within the range of condition (7).

Conversely, the focal lengths of the negative lens L11 and the positive lens L12 must become shorter in order to correct chromatic aberrations if the Abbe constant v1 of the negative lens L11 exceeds the upper limit of condition (6). Spherical aberrations and chromatic aberrations both increase as a result of the shortening of the focal lengths of negative lens L11 and positive lens L12.

In each embodiment of the present invention, the internal focus objective lens of the present invention comprises, in order from the object side:

a first lens group G1, which has a positive refractory power, and a second lens group G2 with a negative refractory power. The first lens group G1 is composed of a composite lens L1 that has a negative lens L11 and a positive lens L12 and a single lens L2 with a positive refractory power. The second lens group G2 is composed of a composite lens L3 that has a positive lens L31 and a negative lens L32.

FIG. 1 shows the arrangement of each lens group in the infinite focus condition. When a close object is focused upon, the second lens group G2 is moved along the optical axis.

In each embodiment, an erecting prism G3, as shown in FIG. 1, is positioned between the second lens group G2 and the image surface, shown by arrow X.

Embodiment 1

The internal focus objective lens of a first embodiment according to the invention comprises, in order from the object side, a first lens group G1 and a second lens group G2. The first lens group G1 has a composite lens L1 and a single lens L2. Composite lens L1 includes a negative meniscus lens L11 with a convex surface facing the object side and a lens L12 with two convex surfaces. Single lens L2 is a lens with two convex surfaces. The second lens group G2 consists of a composite lens L3 that has a positive meniscus lens L31 and a lens 32 with two convex surfaces.

The values for embodiment 1 are shown in Table 1. In Table 1, the numbers in the left column indicate each lens surface in order from the object side. r is the radius of curvature of each lens surface. d is the distance between each lens surface. n and v show the refraction rate and Abbe constant, respectively, of the d line ($\lambda$=587.6 nm). L is the overall length of the lens, however, prism G3 is lengthened for atmospheric conversion. $\delta$ is the length of movement for the second lens group G2 from the infinite focus condition to focus on a close object at a distance of 0.87 m.

TABLE 1

| Lens surface | r | d | v | n |
|---|---|---|---|---|
| 1 | 179.03 | 0.57 | 47.5 | 1.78797 |
| 2 | 27.56 | 1.90 | 82.5 | 1.49782 |
| 3 | −83.04 | 0.10 | | |
| 4 | 28.28 | 1.64 | 82.5 | 1.49782 |
| 5 | −946.29 | (d5 = variable) | | |
| 6 | −90.00 | 0.72 | 36.3 | 1.62004 |
| 7 | −10.89 | 0.38 | 56.0 | 1.S6883 |
| 8 | 21.63 | (d8 = variable) | | |
| 9 | ∞ | 19.05 | 64.1 | 1.51680 |
| 10 | ∞ | 7.47 | | |

Given the configuration of lenses L12 and L13, the distances d5 and d8 vary as follows:

| | infinite | close (0.87 m) |
|---|---|---|
| d5 | 35.50 | 40.46 |
| d8 | 10.67 | 5.71 |

Values For Conditions

F=100.0
f1=53.18
f2=−35.01
r2=27.56
r4=28.28
r6=−90.00
r8=21.63
v1=47.5
v2=82.5

CONDITIONS (1) f1/F=0.53
(2) f2/F=−0.35
(3) r4/F=0.28
(4) (r6+r8)/(r6−r8)=0.61
(5) r2/F=0.28
(6) v1=47.5
(7) v2=82.5 overall lens length L=71.51
movement distance $\delta$=4.96

FIGS. 2a–2c and 3a–3c are representations of the various aberrations in the infinite focus condition and in the close (0.87 m) focus condition of the first embodiment, respectively. In each figure, $F_{NO}$ represents F-number, d represents the d line ($\lambda$=587.6 nm), C shows the c line ($\lambda$=656.3 nm), F shows the f line ($\lambda$=486.1 nm), and NA is the numerical aperture.

In the aberration diagrams that show astigmatisms, a solid line designates the sagittal plane s, and a broken line designates the meridional plane m. In the aberration diagrams that show spherical aberrations, a broken line designates the sine condition.

As is clear from the aberration diagrams, the various aberrations can be properly corrected, even in the close focus condition, with the present invention.

Embodiment 2

The second embodiment of the internal focus-type objective lens comprises, in order from the object side, a first lens group G1 and a second lens group G2. The first lens group G1 has a composite lens L1 and a positive meniscus lens L2. The first composite lens L1 includes a negative meniscus lens L11 having a convex surface facing the object side and a lens L12 having two convex surfaces. Positive meniscus lens L2 has a convex surface on the object side. Second lens group G2 consists of a composite lens L3. Composite lens L3 has a positive meniscus lens L31 with a concave surface on the object side and a lens L32 having two concave surfaces.

The values for embodiment 2 of the present invention are shown in Table 2. In Table 2, the numbers in the left column indicate each lens surface in order from the object side. r is the radius of curvature of each lens surface. d is the distance between each lens surface. n and v show the refraction rate and Abbe constant, respectively, of the d line ($\lambda$=587.6 nm). L is the overall length of the lens, however, prism G3 is lengthened for atmospheric conversion. $\delta$ is the length of movement for the second lens group G2 from the infinite focus condition to focus on a close object at a distance of 0.87 m.

TABLE 2

| Lens Surface | r | d | v | n |
|---|---|---|---|---|
| 1 | 200.00 | 0.57 | 47.5 | 1.78797 |
| 2 | 30.43 | 1.90 | 82.5 | 1.49782 |
| 3 | −83.04 | 0.10 | | |
| 4 | 29.33 | 1.64 | 82.5 | 1.49782 |
| 5 | 26303.52 | (d5 = variable) | | |
| 6 | −342.86 | 0.72 | 36.3 | 1.62004 |
| 7 | −15.24 | 0.38 | 56.0 | 1.56883 |
| 8 | 21.43 | (d8 = variable) | | |
| 9 | ∞ | 19.05 | 64.1 | 1.51680 |
| 10 | ∞ | 6.63 | | |

Given the configuration of lenses L12 and L13, the distances d5 and d8 vary as follows:

|  | infinite | close (0.87 m) |
|---|---|---|
| d5 | 38.56 | 44.80 |
| d8 | 10.79 | 4.55 |

Values For Conditions

F=100.0 f1=57.14 f2=−40.00 r2=30.43 r4=29.33 r6=−342.86 r8=21.63 v1=47.5 v2=82.5

CONDITIONS (1) f1/F=0.57

(2) f2/F=−0.40

(3) r4/F=0.29

(4) (r6+r8)/(r6−r8)=0.88

(5) r2/F=0.30

(6) v1=47.5

(7) v2=82.5 overall lens length L=73.85 movement distance δ=6.24

FIGS. 4a–4c and 5a–5c are representations of the various aberrations in the infinite focus condition and in the close (0.87 m) focus condition of the second embodiment respectively. In each Figure, $F_{NO}$ represents the F number, d shows the d line (λ=587.6 nm), C shows the c line (λ=656.3 nm), F shows the f line (λ=486.1 nm), and NA is the numerical aperture.

In the aberration diagrams that show astigmatisms, a solid line designates the sagittal plane s, and a broken line designates the meridional plane m. In the aberration diagrams that show spherical aberrations, a broken lane designates the sine condition.

As is clear from the aberration diagrams, with the present invention, various aberrations can be properly corrected even in the close focus condition.

Embodiment 3

The third embodiment of the internal focus-type objective lens comprises, in order from the object side, a first lens group G1, which has a composite lens L1, composed of a negative meniscus lens L11 with a convex surface facing the object side and a lens L12 with two convex surfaces, and a lens L2, which is convex on both sides, and a second lens group G2, which consists of a composite lens L3 that has a positive meniscus L31 with a concave surface on the object side and a lens 32 with two concave surfaces.

The values for embodiment 3 of the present invention are shown in Table 3. In Table 3, the numbers on the left indicate each lens surface in order from the object side. r is the radius of curvature of each lens surface. d is the distance between each lens surface. n and v show the refraction rate and Abbe constant, respectively, of the d line (λ=587.6 nm). L is the overall length of the lens, however, prism G3 is lengthened for atmospheric conversion. δ is the length of movement for the second lens group G2 from the infinite focus condition to focus on a close object at a distance of 0.87 m.

TABLE 3

|  | r | d | v | n |
|---|---|---|---|---|
| 1 | 139.43 | 0.57 | 47.5 | 1.78797 |
| 2 | 25.01 | 1.90 | 82.5 | 1.49782 |
| 3 | −83.04 | 0.10 |  |  |
| 4 | 25.33 | 1.64 | 82.5 | 1.49782 |
| 5 | −430.93 | (d5 = variable) |  |  |
| 6 | −76.19 | 0.72 | 36.3 | 1.62004 |
| 7 | −10.89 | 0.38 | 56.0 | 1.56883 |
| 8 | 19.22 | (d8 = variable) |  |  |
| 9 | ∞ | 19.05 | 64.1 | 1.51680 |
| 10 | ∞ | 9.62 |  |  |

Given the configuration of lenses L12 and L13, the distances d5 and d8 vary as follows:

|  | infinite | close (0.87 m) |
|---|---|---|
| d5 | 30.50 | 34.12 |
| d8 | 10.68 | 7.06 |

Values For Conditions

F=100.0 f1=47.62 f2=−30.17 r2=25.01 r4=25.33 r6=−76.19 r8=19.22 v1=47.5 v2=82.5

CONDITIONS (1) f1/F=0.48

(2) f2/F=−0.30

(3) r4/F=0.25

(4) (r6+r8)/(r6−r8)=0.60

(5) r2/F=0.25

(6) v1=47.5

(7) v2=82.5 overall lens length L=68.67 movement distance δ=3.62

FIGS. 6a–6c and 7a–7c are representations of the various aberrations in the infinite focus condition and in the close (0.87 m) focus condition of the third embodiment, respectively. In each Figure, $F_{NO}$ represents the F number, d represents the d line (λ=587.6 nm), C shows the c line (λ=656.3 nm), F shows the f line (λ=486.1 nm), and NA is the numerical aperture.

In the aberration diagrams that show astigmatisms, a solid line designates the sagittal plane s, and a broken line designates the meridional plane m. In the aberration diagrams that show spherical aberrations, a broken line designates the sine condition.

As is clear from the aberration diagrams, with the present invention, the various aberrations can be properly corrected even in the close focus condition.

According to the present invention, as the movement distance of the focus lens group is decreased, even in a close focus condition, the various aberrations can be properly corrected. Thus, an objective lens with a short overall length can be obtained.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An internal focus objective lens system, the lens system from the object side to the image side of the lens system comprising:

a first lens group having a positive refractory power; and a second lens group having a negative refractory power, wherein:

the first lens group has a first composite lens and a single lens, the first composite lens comprises a negative lens and a positive lens, the single lens of the first lens groups has a positive refractory power, the second lens group has a second composite lens that has an overall negative refractory power, the second lens group is capable of movement along an optical axis of the lens system for focusing, and wherein the focal length of the entire lens system is F, the focal length of the first lens group is f1, the focal length of the second lens group is f2, the radius of curvature of a joining surface of the composite lens within the first lens group is r2, the radius of curvature of the single lens of the first lens group on the object side is r4, the radius of curvature of the composite lens of the second lens group on the object side is r6, the radius of curvature of the composite lens of the second lens group on the image side is r8, the Abbe constant of the negative lens that forms the composite lens within the first lens group is v1, and the Abbe constant of the positive lens that forms the composite lens of the first lens group is v2;

the lens system satisfying following conditions:
   0.3<(f1/F)<0.6
   −0.5<(f2/F)<−0.2
   0.15<(r4/F)<0.35
   −1.5<(r6+r8)/(r6−r8)<1.5
   0.15<(r2/F)<0.4
   40<v1<55
   80<v2.

2. An internal focus objective lens system according to claim 1, wherein the second composite lens includes a negative lens and a positive lens.

3. An internal focus objective lens system according to claim 1, wherein the negative lens of the first composite lens is a negative meniscus lens having a convex surface facing the object side of the lens system.

4. An internal focus objective lens system according to claim 1, wherein the positive lens of the first composite lens is a lens having two convex surfaces.

5. An internal focus objective lens system according to claim 1, wherein the negative lens of the first composite lens is a negative meniscus lens having a convex surface facing the object side of the lens system, and wherein the positive lens of the first composite lens is a lens having two convex surfaces.

6. An internal focus objective lens system according to claim 1, wherein the single lens of the first lens group is a lens having two convex surfaces.

7. An internal focus objective lens system according to claim 1, wherein:

the negative lens of the first composite lens is a negative meniscus lens having a convex surface facing the object side of the lens system, the positive lens of the first composite lens is a lens having two convex surfaces, and the single lens of the first lens group is a lens having two convex surfaces.

8. An internal focus objective lens system according to claim 7, wherein the second composite lens includes a negative lens and a positive lens.

9. An internal focus objective lens system according to claim 1, wherein the single lens of the first lens group is a positive meniscus lens having a convex surface facing the object side of the lens system.

10. An internal focus objective lens system according to claim 2, wherein the positive lens of the second composite lens is closer to the object side of the system than the negative lens of the second composite lens.

11. An internal focus objective lens according to claim 2, wherein the positive lens of the second composite lens is a positive meniscus lens having concave surface facing the object side of the lens system.

12. An internal focus objective lens system according to claim 2, wherein the negative lens of the second composite lens is a lens having two concave surfaces.

13. An internal focus objective lens system according to claim 2, wherein the positive lens of the second composite lens is a positive meniscus lens having a concave surface on the object side of the lens system and the negative lens of the second composite lens is a lens with two concave surfaces.

14. An internal focus objective lens system according to claim 2, wherein:

the single lens of the first lens group is a positive meniscus lens having a convex surface facing the object side of the lens system, the negative lens of the first composite lens is a negative meniscus lens having a convex surface facing the object side of the lens system, the positive lens of the first composite lens is a lens having two convex surfaces, the positive lens of the second composite lens is a positive meniscus lens having a concave surface facing the object side of the lens system, and the negative lens of the second composite lens is a lens with two concave surfaces.

15. An internal focus objective lens system according to claim 2, wherein:

the negative lens of the first composite lens is a negative meniscus lens having a convex surface facing the object side of the lens system, the positive lens of the first composite lens is a lens having two convex surfaces, the single lens of the first lens group is a lens having two convex surfaces, the positive lens of the second lens group is a positive meniscus lens with a concave surface facing the object side of the lens system, and the negative lens of the second composite lens is a lens having two concave surfaces.

16. An internal focus objective lens system, the lens system from the object side to the image side consisting essentially of:

a first lens group having a positive refractory power; and a movable second lens group having an overall negative refractory power, wherein:

the first lens group includes a first composite lens and a single lens, the first composite lens comprises a negative lens and a positive lens, the single lens of the first lens group has a positive refractory power, and wherein the second lens group includes a second composite lens, the second composite lens having an overall negative refractory power and includes a positive meniscus lens having a concave surface on the object side of the lens system and a lens with two concave surfaces, and wherein the lens system satisfies a plurality of conditions to accurately compose images when focusing near objects as well as distant objects.

17. An internal focus objective lens system according to claim 16, wherein the single lens of the first lens group is a lens having two convex surfaces.

18. An internal focus objective lens system according to claims 17, wherein the negative lens of the first composite lens is a negative meniscus lens having a convex surface facing the object side of the lens system.

19. An internal focus objective lens system according to claim 17, wherein the positive lens of the first composite lens is a lens having two convex surfaces.

20. An internal focus objective lens system according to claim 17, wherein the negative lens of the first composite lens is a negative meniscus lens having a convex surface facing the object side of the lens system, and the positive lens of the first composite lens is a lens having two convex surfaces.

21. An internal focus objective lens system according to claim 16, wherein the single lens of the first lens group is a positive meniscus lens having a convex surface facing the object side of the lens system.

22. An internal focus objective lens system according to claim 16, wherein the single lens of the first lens group is a positive meniscus lens having a convex surface facing the object side of the lens system.

23. An internal focus objective lens system according to claim 16, wherein the single lens of the first lens group is a lens having two convex surfaces.

24. An internal focus objective lens system according to claim 16, wherein the plurality of conditions to be satisfied by the lens system include, $0.3 < (f1/F) < 0.6$ $-0.5 < (f2/F) < -0.2$ $0.15 < (r4/F) < 0.35$ $-1.5 < (r6+r8)/(r6-r8) < 1.5$ $0.15 < (r2/F) < 0.4$ $40 < v1 < 55$ $80 < v2$;

wherein the focal length of the entire lens system is F, the focal length of the first lens group is f1, the focal length of the second lens group is f2, the radius of curvature of a joining surface of the composite lens within the first lens group is r2, the radius of curvature of the single lens of the first lens group on the object side is r4, the radius of curvature of the composite lens of the second lens group on the object side is r6, the radius of curvature of the composite lens of the second lens group on the image side is r8, the Abbe constant of the negative lens that forms the composite lens within the first lens group is v1, and the Abbe constant of the positive lens that forms the composite lens of the first lens group is v2.

\* \* \* \* \*